(12) United States Patent
Sakurada et al.

(10) Patent No.: US 12,111,173 B2
(45) Date of Patent: Oct. 8, 2024

(54) INFORMATION PROCESSING DEVICE, INFORMATION PROCESSING METHOD, AND TERMINAL DEVICE

(71) Applicant: TOYOTA JIDOSHA KABUSHIKI KAISHA, Toyota (JP)

(72) Inventors: Shin Sakurada, Toyota (JP); Kazuya Nishimura, Anjo (JP); Yuko Mizuno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 17/660,282

(22) Filed: Apr. 22, 2022

(65) Prior Publication Data

US 2023/0010783 A1  Jan. 12, 2023

(30) Foreign Application Priority Data

Jul. 8, 2021 (JP) .................................. 2021-113860

(51) Int. Cl.
*G01C 21/36* (2006.01)
*A61G 5/04* (2013.01)
*A61G 5/10* (2006.01)
*G05D 1/00* (2006.01)
*G06F 3/14* (2006.01)

(52) U.S. Cl.
CPC .......... *G01C 21/365* (2013.01); *A61G 5/041* (2013.01); *A61G 5/10* (2013.01); *G05D 1/021* (2013.01); *G06F 3/14* (2013.01)

(58) Field of Classification Search
CPC ........ G01C 21/365; A61G 5/041; A61G 5/10; G05D 1/021; G06F 3/14
See application file for complete search history.

(56) References Cited

U.S. PATENT DOCUMENTS

| | | | |
|---|---|---|---|
| 2018/0135987 A1* | 5/2018 | Evans | G01C 21/20 |
| 2019/0290514 A1* | 9/2019 | Garland | A61G 5/061 |
| 2020/0030167 A1* | 1/2020 | Palombo | A61G 5/041 |
| 2020/0237591 A1* | 7/2020 | Choi | A61G 5/1005 |
| 2021/0089037 A1* | 3/2021 | Fukuoka | A61G 5/045 |
| 2022/0379806 A1* | 12/2022 | Spoor | B60Q 1/0023 |

FOREIGN PATENT DOCUMENTS

| | | | |
|---|---|---|---|
| CN | 205951816 U | * | 2/2017 |
| JP | 2001109995 A | | 4/2001 |
| JP | 2014225151 A | | 12/2014 |
| JP | 2015105046 A | | 6/2015 |
| JP | 2019056674 A | | 4/2019 |
| KR | 20110099202 A | * | 9/2011 |
| KR | 20200128883 A | * | 11/2020 |

OTHER PUBLICATIONS

English translation of KR 20110099202 A (Year: 2011).*
English translation of CN-205951816-U (Year: 2017).*
English translation of KR 20200128883 A (Year: 2020).*

* cited by examiner

*Primary Examiner* — Anshul Sood
*Assistant Examiner* — Matthew Ho
(74) *Attorney, Agent, or Firm* — Dickinson Wright, PLLC

(57) ABSTRACT

An information processing device includes a control unit that determines a travel path of a wheelchair. The control unit determines the travel path of the wheelchair based on information on a step existing on a road surface on which the wheelchair travels and information on a wheel of the wheelchair.

16 Claims, 6 Drawing Sheets

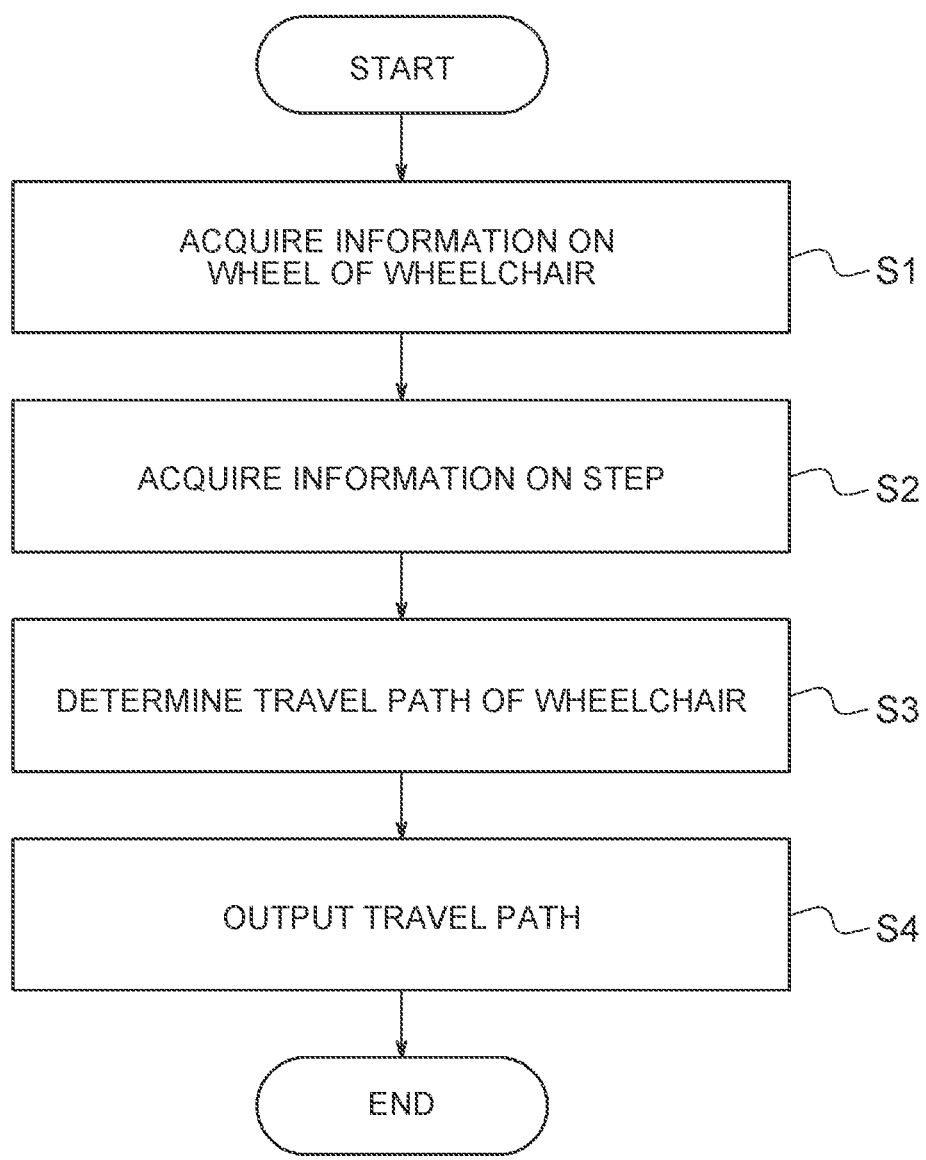

INFORMATION PROCESSING DEVICE, INFORMATION PROCESSING METHOD, AND TERMINAL DEVICE

CROSS-REFERENCE TO RELATED APPLICATION

This application claims priority to Japanese Patent Application No. 2021-113860 filed on Jul. 8, 2021, incorporated herein by reference in its entirety.

BACKGROUND

1. Technical Field

The present disclosure relates to an information processing device, an information processing method, and a terminal device.

2. Description of Related Art

Conventionally, there is known a configuration that notifies, when a pedestrian starts crossing a desired place on a road, the surrounding vehicles that there is a pedestrian crossing the place (see, for example, Japanese Unexamined Patent Application Publication No. 2014-225151 (JP 2014-225151 A).

SUMMARY

Wheelchairs may be difficult to travel depending on the road conditions. It is required to make wheelchairs easier to travel.

An object of the present disclosure made in view of such circumstances is to improve the convenience in traveling of the wheelchair.

An information processing device according to an embodiment of the present disclosure includes a control unit that determines a travel path of a wheelchair. The control unit determines the travel path of the wheelchair based on information on a step existing on a road surface on which the wheelchair travels and information on a wheel of the wheelchair.

An information processing method according to the embodiment of the present disclosure includes determining a travel path of a wheelchair. The information processing method includes determining the travel path of the wheelchair based on information on a step existing on a road surface on which the wheelchair travels and information on a wheel of the wheelchair.

A terminal device according to the embodiment of the present disclosure is mounted on a wheelchair or carried by a user of the wheelchair. The terminal device acquires from an information processing device a travel path of the wheelchair determined by the information processing device based on information on a step existing on a road surface on which the wheelchair travels and a shape of a wheel of the wheelchair.

According to the information processing device, the information processing method, and the terminal device according to the embodiment of the present disclosure, the convenience of traveling in a wheelchair can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart showing a procedure example of an information processing method according to the embodiment.

DETAILED DESCRIPTION OF EMBODIMENTS

Configuration Example of Information Processing System 1

Figure 1:
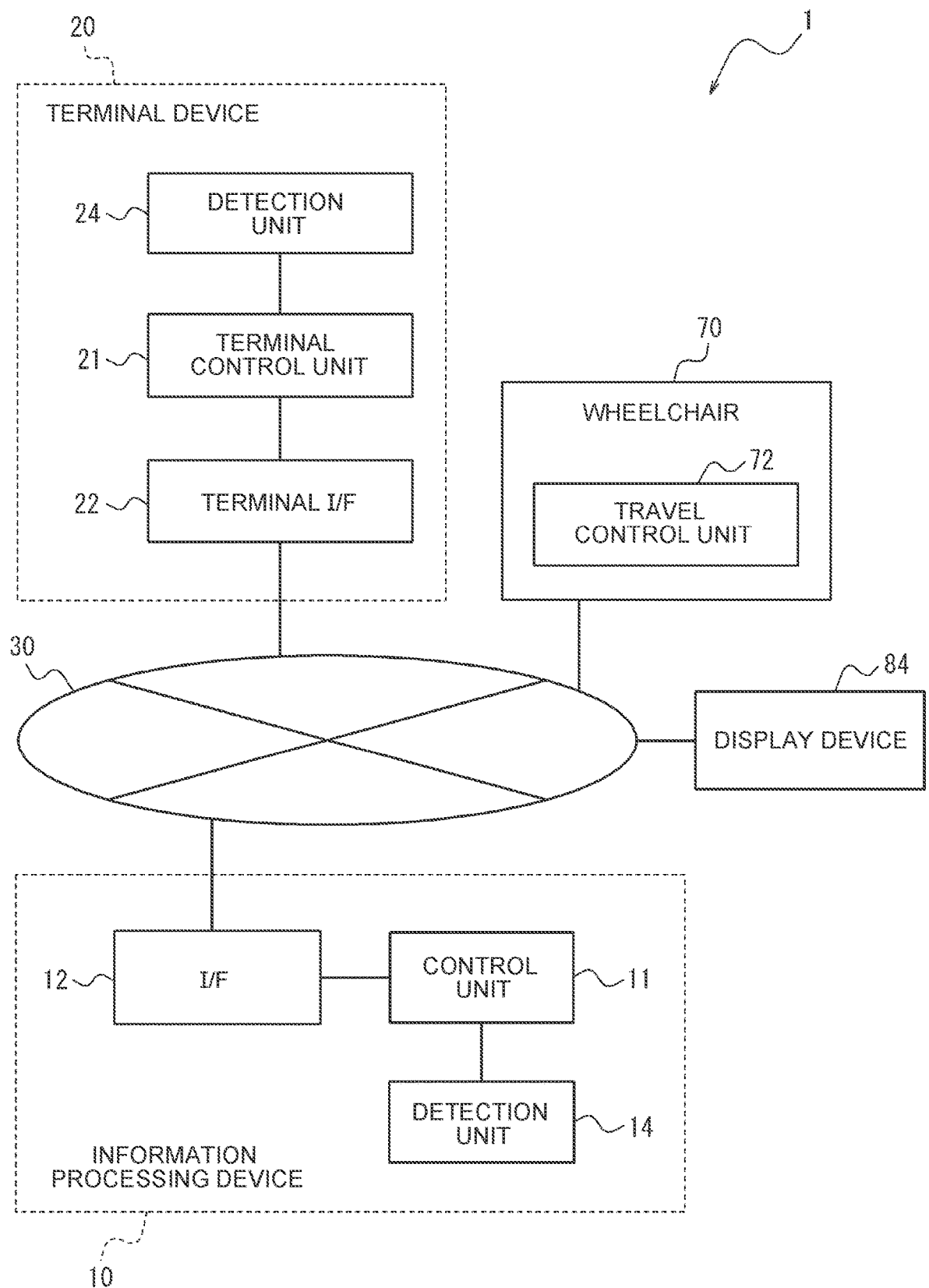
FIG. 1 is a block diagram showing a configuration example of an information processing system according to an embodiment.
Figure 2:
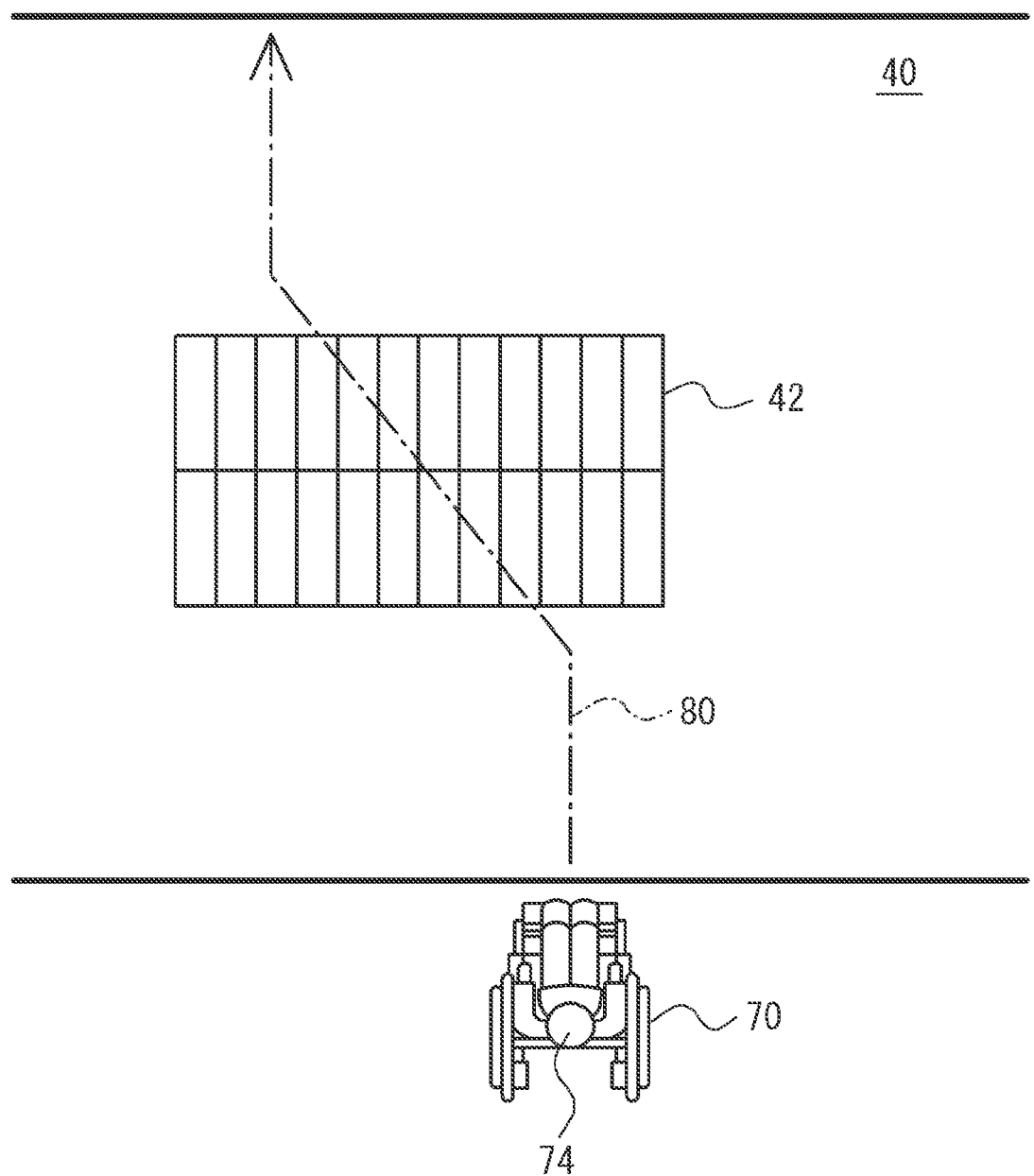
FIG. 2 is a diagram showing an example of a travel path of a wheelchair traveling on a step on a road surface.
Figure 3:
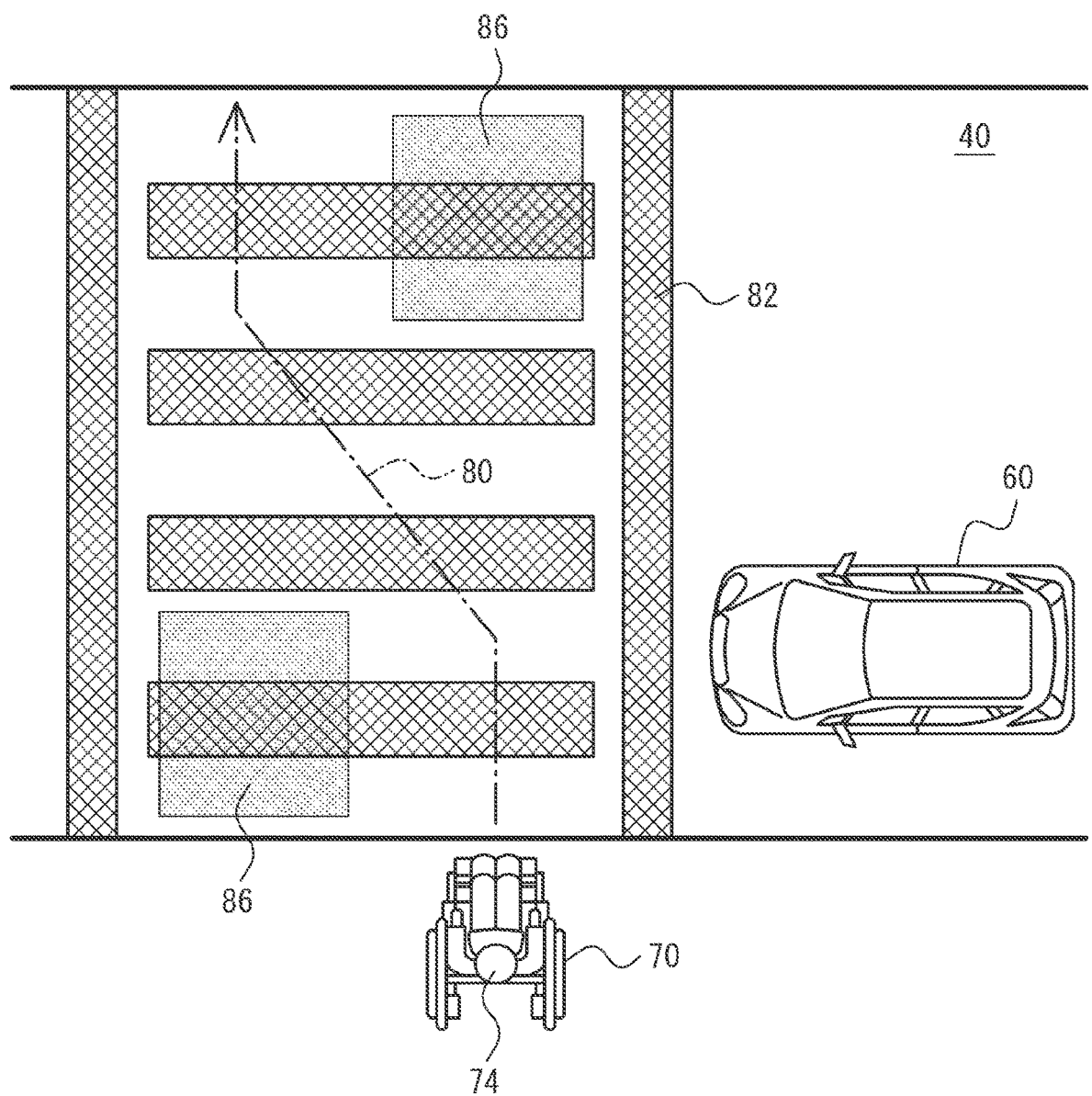
FIG. 3 is a diagram showing an example of a travel path of a wheelchair traveling while avoiding a travel prohibited area.

As shown in FIG. 1, an information processing system 1 according to an embodiment includes an information processing device 10 and a terminal device 20. The information processing device 10 determines a travel path 80 of a wheelchair 70 that crosses a road 40, as illustrated in FIGS. 2 and 3. The information processing device 10 determines the travel path 80 of the wheelchair 70 based on information on a step existing on the road surface of the road 40 and information on a wheel of the wheelchair 70. The information processing device 10 notifies the wheelchair 70 or a user 74 of the wheelchair 70 of the determined travel path 80 using the terminal device 20. The terminal device 20 may be mounted on the wheelchair 70. The terminal device 20 may be carried by the user 74. The terminal device 20 acquires the travel path 80 of the wheelchair 70 from the information processing device 10, notifies the user 74 of the travel path 80, and controls the wheelchair 70 to travel along the travel path 80. The information processing system 1 further includes a display device 84, although not essential. The display device 84 may be configured to display the travel path 80 of the wheelchair 70 on the road 40. The display device 84 may be configured to display a pedestrian crossing 82 on the road 40 on which a vehicle 60 travels. Hereinafter, a configuration example of the information processing system 1 will be described.

Information Processing Device 10

The information processing device 10 includes a control unit 11 and a server interface 12. The server interface 12 is also referred to as an I/F 12.

The control unit 11 controls each component of the information processing device 10. The control unit 11 may be configured to include one or more processors. According to the present embodiment, the "processor" is a general-purpose processor, a dedicated processor specialized for specific processing, or the like. However, the processor is not limited thereto. The control unit 11 may be configured to include one or more dedicated circuits. The dedicated circuit may include, for example, a field-programmable gate array (FPGA) or an application-specific integrated circuit (ASIC). The control unit 11 may be configured to include the dedicated circuit instead of the processor, or may be configured to include the dedicated circuit together with the processor.

The information processing device 10 may further include a storage unit. The storage unit is, for example, a semiconductor memory, a magnetic memory, or an optical memory. However, the storage unit is not limited to these memories. The storage unit may function as, for example, a main storage device, an auxiliary storage device, or a cache memory. The storage unit may include an electromagnetic storage medium such as a magnetic disk. The storage unit stores any information used for the operation of the information processing device 10. The storage unit may store, for example, a system program, an application program, or the like. The storage unit may be included in the control unit 11.

The I/F 12 outputs information, data, or the like from the control unit 11, and inputs information, data, or the like to the control unit 11. The I/F 12 is also simply referred to as an interface or an I/F.

The I/F 12 may include a communication module configured to be communicable with the display device 84 or the like via a network 30. The communication module may include a communication module corresponding to mobile communication standards such as the fourth generation (4G) or the fifth generation (5G). However, the communication module is not limited to this. The I/F 12 may be configured to be connectable to the communication module.

The information processing device 10 may include one server device or a plurality of server devices that can communicate with each other.

The information processing device 10 further includes a detection unit 14, although not essential. The detection unit 14 detects information on a step existing on the road surface of the road 40 to be crossed by the wheelchair 70. The step existing on the road surface may be a portion where the height of the road surface changes by a predetermined value or more per unit length. The predetermined value can be appropriately determined. The predetermined value may be set to, for example, a value at which the gradient of the road surface is 45 degrees or more, but the predetermined value is not limited to this and may be set to various values. The information on a step existing on the road surface of the road 40 is also referred to as step information. The step information may include, for example, information for specifying a position or a range in which a step exists on the road surface of the road 40. The step information may include, for example, information for specifying the length or width of a groove, the diameter of the hole, or the like provided on the road surface of the road 40. The step information may include information that specifies the depth of the groove or the hole. The step information may include, for example, information for specifying the length or width of a linear protrusion, the diameter of an island-shaped protrusion, or the like provided on the road surface of the road 40. The step information may include information that specifies the height of the protrusion.

The detection unit 14 may be configured to include, for example, a camera that photographs the road surface of the road 40. The detection unit 14 may be configured to include a distance sensor that detects the distance to each point on the road surface of the road 40. The detection unit 14 may calculate the coordinates or the height of each point on the road surface of the road 40 as the step information based on the detected information on the road surface. The detection unit 14 may detect a step existing on the road surface of the road 40 based on the detected information on the road surface and generate the information as the step information.

The detection unit 14 may output the step information to the control unit 11. The detection unit 14 may output the detected information on the road surface to the control unit 11. The control unit 11 may detect a step existing on the road surface of the road 40 based on the information on the road surface detected by the detection unit 14 and calculate the information as the step information.

Terminal Device 20

As shown in FIG. 1, the terminal device 20 includes a terminal control unit 21 and a terminal interface 22. The terminal interface 22 is also referred to as a terminal I/F 22.

The terminal control unit 21 controls each component of the terminal device 20. The terminal control unit 21 may be configured to be the same as or similar to the control unit 11 of the information processing device 10. The terminal control unit 21 may be configured to include one or more processors. The terminal control unit 21 may be configured to include one or more dedicated circuits. The dedicated circuit may include, for example, an FPGA or an ASIC. The terminal control unit 21 may be configured to include the dedicated circuit instead of the processor, or may be configured to include the dedicated circuit together with the processor.

The terminal device 20 may further include a storage unit. The storage unit of the terminal device 20 may be configured to be the same as or similar to the storage unit of the information processing device 10. The storage unit is, for example, a semiconductor memory, a magnetic memory, or an optical memory. However, the storage unit is not limited to these memories. The storage unit may function as, for example, a main storage device, an auxiliary storage device, or a cache memory. The storage unit may include an electromagnetic storage medium such as a magnetic disk. The storage unit stores any information that is used for the operation of the terminal device 20. The storage unit may store, for example, a system program, an application program, or the like. The storage unit may be included in the terminal control unit 21.

The terminal I/F 22 transmits to the information processing device 10 information, data, or the like output from the terminal control unit 21. The terminal T/F 22 may include a communication module configured to be communicable with other devices such as the information processing device 10 via the network 30. The communication module may include a communication module conforming to mobile communication standards such as the 4G or the 5G. However, the communication module is not limited thereto.

The terminal I/F 22 may be configured to include an input device that receives an input of information, data, or the like from the user. The input device may be configured to include, for example, a touch panel or a touch sensor, or a pointing device such as a mouse. The input device may be configured to include a physical key. The input device may be configured to include a voice input device such as a microphone.

The terminal I/F 22 may include, for example, a display device that outputs visual information such as images, characters, or figures to the user. The display device may be configured to include, for example, a liquid crystal display (LCD), an organic electro-luminescence (EL) display or an inorganic EL display, a plasma display panel (PDP), or the like. The display device is not limited to the displays above, and may be configured to include various other types of displays. The display device may be configured to include a light emitting element such as a light emitting diode (LED) or a laser diode (LD). The display device may be configured to include various other devices.

The terminal device 20 further includes a detection unit 24 that detects the step information of the road surface of the road 40, although not essential. The detection unit 24 may be configured to be the same as or similar to the detection unit 14 of the information processing device 10. The terminal device 20 may output the step information to the information processing device 10. The detection unit 24 may detect information such as an image of the road surface or a distance to each point on the road surface as information for generating the step information, and output the information to the information processing device 10.

The terminal device 20 may further include a position information acquisition unit that acquires the position information of the terminal device 20 itself. The position information acquisition unit may be configured to include a receiver for a satellite positioning system. The receiver compatible with the satellite positioning system may include, for example, a global positioning system (GPS) receiver.

The terminal device 20 may be mounted on the wheelchair 70 or may be carried by the user 74 of the wheelchair 70. When the terminal device 20 is mounted on the wheelchair 70, the terminal device 20 may notify the user 74 of the travel path 80 of the wheelchair 70 or may control the traveling of the wheelchair 70. When the terminal device 20 is carried by the user 74, the terminal device 20 may notify the user 74 of the travel path 80 of the wheelchair 70.

The number of the terminal devices 20 included in the information processing system 1 is not limited to one, and may be two or more. The terminal device 20 may be configured to include a mobile terminal such as a smartphone or a tablet, or a personal computer (PC) such as a laptop PC or a tablet PC. The terminal device 20 is not limited to the examples above, and may be configured to include various devices.

Display Device 84

The display device 84 may be configured to include one or more processors. The display device 84 may be configured to include one or more dedicated circuits. The display device 84 may be configured to include a storage unit. The storage unit of the display device 84 may be configured to be the same as or similar to the storage unit of the information processing device 10. The storage unit stores any information used for the operation of the display device 84. The storage unit may store, for example, a system program, an application program, or the like.

The display device 84 may be configured to include an interface for acquiring information, data, or the like from the information processing device 10. The interface may be configured to be the same as or similar to the I/F 12 of the information processing device 10.

The display device 84 is configured to include a display device for displaying the pedestrian crossing 82 on the road surface of the road 40. The display device may be configured to include light sources installed so as to be embedded in the road surface of the road 40, for example. The light source may be configured to include, for example, a light emitting element such as an LED or an LD. The light source may be configured to include, for example, a light bulb or a fluorescent lamp. The display device may be configured to project an image of the pedestrian crossing 82 onto the road surface of the road 40, for example.

The number of the display devices 84 included in the information processing system 1 is not limited to one, and may be two or more.

When the information processing system 1 detects a wheelchair 70 that crosses the road 40, the display device 84 may display the pedestrian crossing 82 on the road 40. When the information processing device 10 detects a wheelchair 70 located within a predetermined distance from the road 40 or a wheelchair 70 staying within a predetermined distance from the road 40 for a predetermined time or more, the information processing device 10 may cause the display device 84 to display the pedestrian crossing 82 so that the wheelchair 70 can cross the road 40.

The information processing system 1 may include a sensor that can detect the presence of the wheelchair 70 such as a camera or a motion sensor as a configuration for detecting the wheelchair 70 located within a predetermined distance from the road 40. The display device 84 may be configured to be able to detect the presence of the wheelchair 70 by being installed in the vicinity of the road 40. The information processing device 10 or the display device 84 may detect the wheelchair 70 located within a predetermined distance from the road 40 by acquiring the position information of the terminal device 20 from the terminal device 20 mounted on the wheelchair 70 or the terminal device 20 carried by the user 74 of the wheelchair 70.

Wheelchair 70

Figure 4:
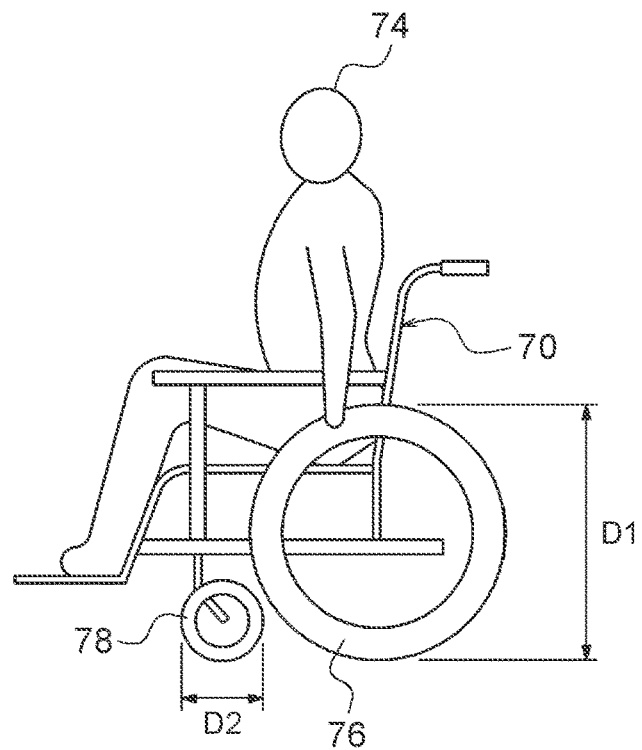
FIG. 4 is a side view showing an example of a wheelchair.

The wheelchair 70 may or may not be included in the information processing system 1. The wheelchair 70 includes drive wheels 76 and casters 78, as shown in FIG. 4. The diameter of the drive wheel 76 is also referred to as a first diameter and is represented by D1. The diameter of the caster 78 is also referred to as a second diameter and is represented by D2.

As shown in FIG. 1, the wheelchair 70 further includes a travel control unit 72, although not essential. The wheelchair 70 may further include a drive device such as a motor. The travel control unit 72 controls the speed of the wheelchair 70 and the like by controlling the drive device. When the wheelchair 70 is equipped with the terminal device 20, or when the user 74 of the wheelchair 70 carries the terminal device 20, the travel control unit 72 may acquire information for controlling the traveling of the wheelchair 70 from the terminal device 20 to control the drive unit. The travel control unit 72 may acquire information for controlling the traveling of the wheelchair 70 from the information processing device 10 to control the drive device.

The wheelchair 70 may further include a sensor that detects the step information of the road surface of the road 40. The sensor of the wheelchair 70 may output the detected step information to the information processing device 10. The sensor of the wheelchair 70 may detect information such as an image of the road surface or a distance to each point on the road surface as information for generating the step information, and output the information to the information processing device 10.

The wheelchair 70 may further include a position information acquisition unit that acquires the position information of the wheelchair 70 itself. The position information acquisition unit may be configured to be the same as or similar to the position information acquisition unit of the terminal device 20.

The wheelchair 70 may be equipped with the information processing device 10. In this case, the information processing device 10 may control the traveling of the wheelchair 70.

Operation Example of Information Processing System 1

In the information processing system 1, the information processing device 10 determines the travel path 80 of the wheelchair 70 by operating as described below, for example.

Acquisition of Wheel Information

The control unit 11 acquires information on the wheels of the wheelchair 70. The information on the wheels of the wheelchair 70 is also referred to as wheel information. The wheel information may include the diameter and the width of the drive wheels 76. The wheel information may include the diameter and the width of the casters 78. The wheel information may include the distance between the right and left drive wheels 76. The wheel information may include the distance between the right and left casters 78. The wheel information may include the distance between the drive wheels 76 and the casters 78. The wheel information may include the angle of the drive wheels 76 with respect to the road surface. The wheel information may include the movable range of the casters 78.

Acquisition of Step Information

The control unit 11 acquires the step information of the road surface around the wheelchair 70. The control unit 11 may acquire the step information of the road surface in a range that the wheelchair 70 may pass when crossing the road 40. The control unit 11 may acquire the step information from the detection unit 14. The control unit 11 may acquire the step information from the terminal device 20 or the wheelchair 70.

The control unit 11 may acquire the shape of the road surface as the step information. The control unit 11 may determine whether there is a step on the road surface based on the shape of the road surface. The step includes a groove or a hole that is lower than the road surface. The step includes a linear or an island-shaped protrusion that is elevated relative to the road surface. For example, in FIG. 2, a grating 42 including grooves (openings) exists on the road surface of the road 40. The control unit 11 may acquire information on the length or the width of the openings of the grating 42, the area where the grating 42 is provided, or the like as the step information. In FIG. 2, the grooves (openings) of the grating 42 extend along the direction for crossing the road 40 (up-down direction on the paper). The direction for crossing the road 40 corresponds to a direction orthogonal to the extending direction of the road 40 (right-left direction on the paper). It can be described that the grooves (openings) of the grating 42 have a longitudinal direction along the direction for crossing the road 40 and a lateral direction along the extending direction of the road 40.

Determination of Travel Path 80

The control unit 11 determines the travel path 80 of the wheelchair 70 based on the wheel information of the wheelchair 70 and the step information of the road surface. As shown in FIG. 2, for example, the control unit 11 may determine a path that intersects the lateral direction of the grooves (openings) of the grating 42 existing on the road surface of the road 40 as the travel path 80. The control unit 11 may determine as the travel path 80 a path extending along the crossing direction of the road 40 in the area where the grating 42 does not exist and a path extending along the direction inclined with respect to the crossing direction of the road 40 in the area where the grating 42 exists. Further, as shown in FIG. 3, the control unit 11 may set a travel prohibited area 86 on the road surface of the road 40 based on the wheel information of the wheelchair 70 and the step information of the road surface, and may determine the travel path 80 of the wheelchair 70 so as to avoid the travel prohibited area 86. Hereinafter, examples of conditions for determining the travel path 80 or conditions for setting the travel prohibited area 86 will be described.

Calculation of Height at which Wheel Enters Step

The control unit 11 may calculate the height at which the wheel of the wheelchair 70 enters the step when the wheelchair 70 is traveling, based on the step information and the wheel information. The control unit 11 may calculate, as the step information, the height at which the wheel of the wheelchair 70 enters the step based on the shape or the position of the step existing on the road surface. The shape of the step may be specified as a shape such as a stepped shape or a groove shape. The shape of the step may be specified as the height of the step, or the depth or the width of the groove. Further, the control unit 11 may calculate, as the wheel information, the height at which the wheel of the wheelchair 70 enters the step based on the diameter or the width of the wheel.

Figure 5:
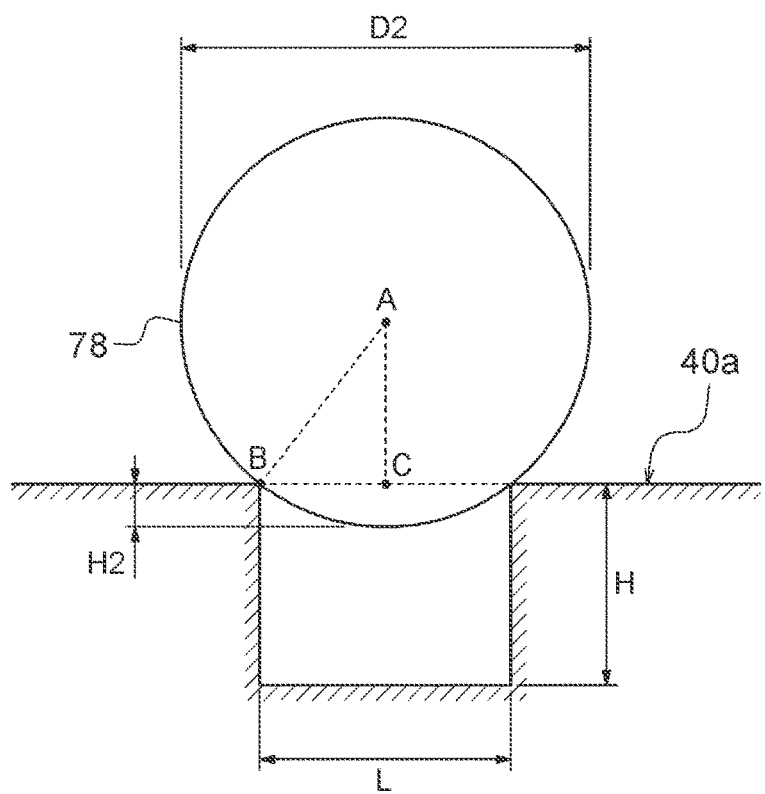
FIG. 5 is a diagram showing a calculation example of a height at which a wheel of the wheelchair enters a step.
Figure 6:
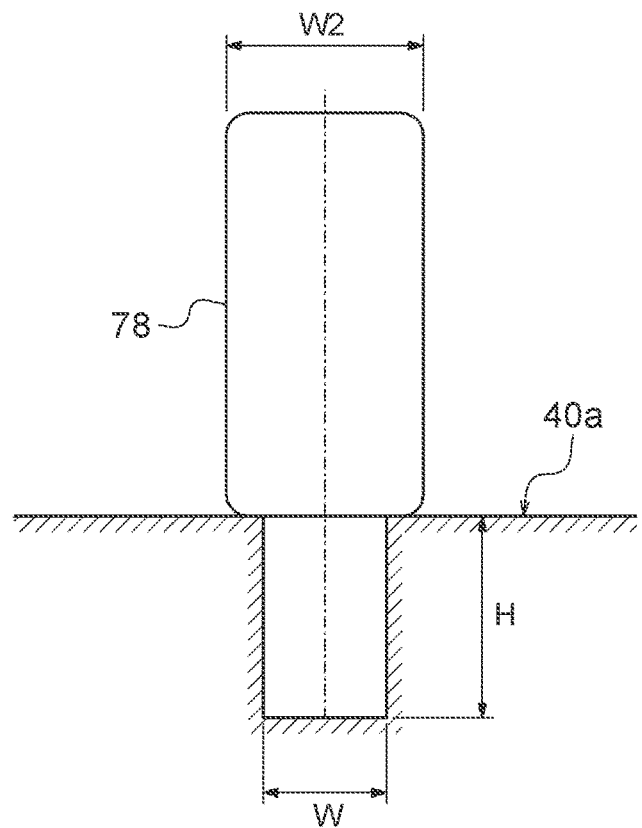
FIG. 6 is a diagram showing a configuration example in which the wheel of the wheelchair straddles a groove.

For example, as shown in FIGS. 5 and 6, an example of calculating the height at which the wheel of the wheelchair 70 enters the step in the case where the caster 78 of the wheelchair 70 is located on a groove-shaped step will be described. The caster 78 may be replaced by the drive wheel 76 or other wheels.

In FIG. 5, it is assumed that the step on the road surface is a groove that is lower than a first surface 40a on which the wheelchair 70 travels. The length of the groove along the traveling direction of the caster 78 is represented by L. The depth of the groove is represented by H. The groove extends in the depth direction or the front direction of the paper. A portion of the caster 78 located above the groove enters the groove. The height of the portion of the caster 78 that enters the groove is represented by H2. The center of the caster 78 is represented by A. The point where the caster 78 contacts the end of the opening of the groove is represented by B. The foot of the perpendicular line obtained by extending downward from the center (A) of the caster 78 to a plane obtained by assuming that the first surface 40a is extended to the opening of the groove is represented by C. Here, the triangle ABC is a right triangle. The length of the side AB is represented by D2/2. The length of the side BC is represented by L/2. The length of the side AC is represented by the square root of the value obtained by subtracting the square of the length of the side BC from the square of the length of the side AB. That is, the length of the side AC is calculated as the square root of $(D2/2)^2-(L/2)^2$. Thus, H2 is represented by the following equation (1). $H2= D2/2-\{(D2/2)^2-(L/2)^2\}^{(1/2)}$ (1)

The control unit 11 may calculate H2 as the height at which the wheel of the wheelchair 70 enters the step based on the equation (1).

In FIG. 6, it is assumed that the step on the road surface is a groove that is lower than the first surface 40a on which the wheelchair 70 travels. The length of the groove in the direction orthogonal to the traveling direction of the caster 78 is represented by W. The depth of the groove is represented by H. The width of the caster 78 is represented by W2. Here, it is assumed that W2 is longer than W. In this case, the caster 78 does not enter the groove. Therefore, the control unit 11 calculates the height at which the wheel of the wheelchair 70 enters the step as zero.

Figure 7:
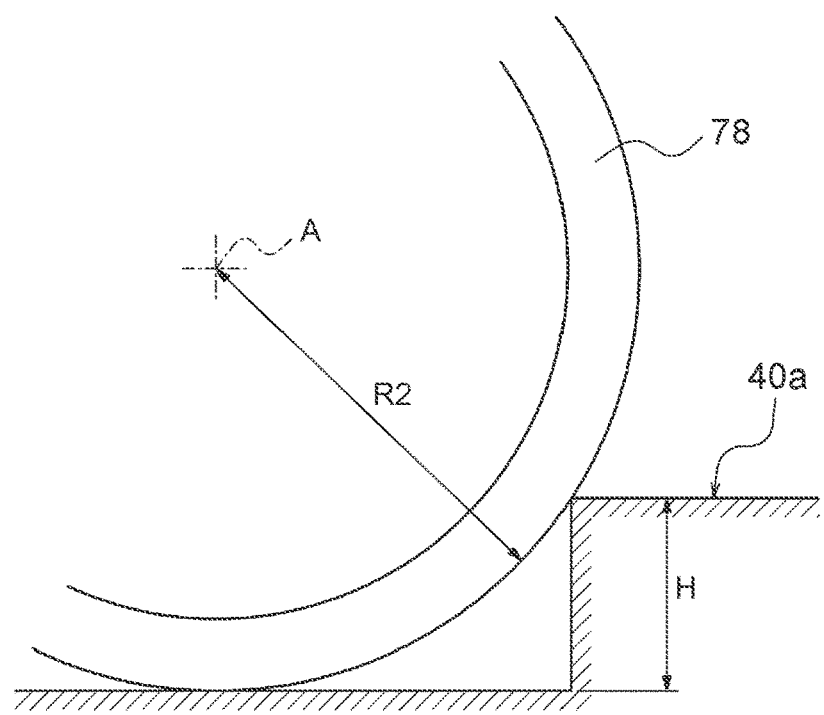
FIG. 7 is a diagram showing the relationship between a radius of the wheel of the wheelchair and a height of the step.

In FIG. 7, it is assumed that the step on the road surface is a step having a road surface that is lower than the first surface 40a on which the wheelchair 70 travels. The height of the step is represented by H. The caster 78 is in contact with the road surface on the lower side of the step. In this case, the control unit 11 calculates the height at which the wheel of the wheelchair 70 enters the step as H.

Determination Based on Height at which Wheel Enters Step

The control unit 11 may determine the travel path 80 of the wheelchair 70 based on the value calculated as the height at which the wheel of the wheelchair 70 enters the step. For example, when the height at which the wheel of the wheelchair 70 enters the step is smaller than the first threshold value, the control unit 11 may determine the travel path 80 including the path passing through the step. That is, the control unit 11 may determine the travel path 80 of the wheelchair 70 so that the height at which the wheel of the wheelchair 70 enters the step is smaller than the first threshold value.

The first threshold value may be set, for example, as a height at which the wheelchair 70 can cross a step. Specifically, when the user 74 moves the wheelchair 70, the magnitude of the force that the user 74 can apply to the wheelchair 70 is limited. Even when the wheelchair 70 travels using the drive device, the magnitude of the force that can be output by the motor or the like is limited. Therefore, the height at which the wheelchair 70 can cross the step is determined based on the upper limit of the force applied to the wheelchair 70. From the above, the first threshold value may be set based on the upper limit of the force that the user 74 can apply to the wheelchair 70 or the upper limit of the force that the drive device such as a motor can output. From the above, when the height at which the wheel of the wheelchair 70 enters the step is smaller than the first threshold value, the force required to move the wheelchair 70 can be reduced. As a result, it is possible to avoid a situation in which the wheelchair 70 becomes immovable or difficult to move. That is, the convenience of the traveling of the wheelchair 70 is improved.

When the step is a groove as illustrated in FIG. 5, the control unit 11 may determine the travel path 80 of the wheelchair 70 so that the wheel of the wheelchair 70 passes through the groove in the direction intersecting the extending direction of the groove or the wheel of the wheelchair 70 passes through the groove in the direction orthogonal to the extending direction of the groove. When the wheel of the wheelchair 70 enters the groove along the direction intersecting the extending direction of the groove, the height at which the wheel of the wheelchair 70 enters the step becomes smaller than when the wheel of the wheelchair 70 enters the groove along the extending direction of the groove. Further, as the direction in which the wheel of the wheelchair 70 enters the groove becomes closer to the direction orthogonal to the extending direction of the groove, the height at which the wheel of the wheelchair 70 enters the step becomes smaller.

When the step is a step as illustrated in FIG. 7, the control unit 11 may determine whether the wheelchair 70 can cross the step based on the diameter or radius of the wheel of the wheelchair 70 and the height of the step. In FIG. 7, the radius of the caster 78 is represented by R2. The height of the step is represented by H. The control unit 11 may determine, for example, that the wheelchair 70 can cross the step when the ratio of H to R2 is smaller than a predetermined ratio. The predetermined ratio may be set based on the upper limit of the magnitude of the force applied to move the wheelchair 70. The predetermined ratio may be set to various values of, for example, ½ or less.

The diameter of the drive wheel 76 and the diameter of the caster 78 of the wheelchair 70 are different. The control unit 11 may calculate each of the height at which the drive wheel 76 enters the step and the height at which the caster 78 enters the step. The control unit 11 may determine the travel path 80 of the wheelchair 70 so that the height at which the drive wheel 76 enters the step is smaller than the second threshold value and the height at which the caster 78 enters the step is smaller than the third threshold value. When the diameter of the drive wheel 76 is larger than the diameter of the caster 78, the second threshold value may be set to a value larger than the third threshold value. By determining the travel path 80 based on the height at which the drive wheel 76 enters the step and the height at which the caster 78 enters the step, the range in which the travel path 80 is determined can be expanded while avoiding a situation in which the wheelchair 70 becomes immovable or difficult to move. As a result, the convenience of the traveling of the wheelchair 70 is improved.

Setting of Travel Prohibited Area 86

The control unit 11 may determine a range in which the wheelchair 70 is difficult to travel based on the wheel information of the wheelchair 70 and the step information of the road surface, and may set the range as the travel prohibited area 86. The control unit 11 may determine a range in which the height at which the wheel of the wheelchair 70 enters the step is equal to or larger than the fourth threshold value as a range in which the wheelchair 70 is difficult to travel. The fourth threshold value may be set to the same value as the first threshold value, the second threshold value, or the third threshold value, or may be set to a different value. The fourth threshold value may be set to a value smaller than the first threshold value or the like so as to avoid a situation in which the wheelchair 70 becomes immovable or difficult to move. The control unit 11 may determine the travel path 80 so as to avoid the travel prohibited area 86. After determining the travel path 80, the control unit 11 may set an area deviating from the travel path 80 as a travel prohibited area 86.

Output of Travel Path 80

When the control unit 11 determines the travel path 80 of the wheelchair 70, the control unit 11 may output the determined travel path 80 from the I/F 12 to the terminal device 20 or the wheelchair 70. The terminal device 20 or the wheelchair 70 may notify the user 74 of the travel path 80. The user 74 may operate and move the wheelchair 70 based on the notified travel path 80. The wheelchair 70 may travel along the travel path 80 by the travel control unit 72 based on the travel path 80 acquired from the information processing device 10.

The control unit 11 may display the determined travel path 80 on the road surface. The control unit 11 may cause the display device 84 to display the determined travel path 80 on the road surface. The control unit 11 may display the determined travel path 80 on the road surface through projection from the wheelchair 70 or the terminal device 20.

The control unit 11 may cause the terminal device 20 to display the travel path 80 so that the user 74 can recognize the travel path 80 of the wheelchair 70, or may cause the display device 84 to display the travel path 80 on the road 40.

Procedure Example of Information Processing Method

The control unit 11 may execute an information processing method including the procedure of a flowchart illustrated in FIG. 8. The information processing method may be realized as an information processing program to be executed by a processor constituting the control unit 11. The information processing program may be stored in a non-transitory computer-readable medium.

The control unit 11 acquires information (wheel information) on the wheel of the wheelchair 70 (step S1). The control unit 11 acquires information (step information) on the step existing on the road surface (step S2). The control unit 11 determines the travel path 80 of the wheelchair 70 based on the wheel information and the step information (step S3). The control unit 11 outputs the determined travel path 80 (step S4). Specifically, the control unit 11 may output the determined travel path 80 to the terminal device 20 or the wheelchair 70. The control unit 11 may cause the display device 84 to display the determined travel path 80 on the road surface. The control unit 11 ends the flowchart of FIG. 8 after executing the procedure of step S4.

Summary

As described above, the information processing system 1 and the information processing device 10 according to the present embodiment can determine the travel path 80 of the wheelchair 70 based on the information on the step existing on the road surface of the road 40 and the information on the wheel of the wheelchair 70. In this way, the wheelchair 70 can easily travel. As a result, the convenience of the traveling of the wheelchair 70 is improved.

Other Embodiments

The information processing system 1 is not limited to the above-described mode, and may be realized in various other modes. Hereinafter, other embodiments will be described.
Travel Path 80 According to Operation of Wheelchair 70

When operating the wheelchair 70, the user 74 of the wheelchair 70 may alternately move the right and left drive wheels 76 with one hand. In this case, the travel path 80 of the wheelchair 70 becomes a finely curved route, that is, a so-called zigzag route. The control unit 11 may determine the travel path 80 of the wheelchair 70 according to the situation in which the user 74 operates the wheelchair 70. For example, the control unit 11 may determine the travel path 80 of the wheelchair 70 so that the user 74 alternately moves the right and left drive wheels 76 of the wheelchair 70 to proceed. The control unit 11 may determine the travel path 80 in consideration of whether to move the left drive wheel 76 or the right drive wheel 76 based on the information on the step on the road surface. In this way, the user 74 can easily operate the wheelchair 70. As a result, the convenience of the traveling of the wheelchair 70 is improved.
Detection of Wheelchair 70

The control unit 11 of the information processing device 10 detects a wheelchair 70 that crosses the road 40. The control unit 11 may detect the wheelchair 70 located within a predetermined distance from the road 40 or the wheelchair 70 staying within the predetermined distance from the road 40 for a predetermined time or more as the wheelchair 70 that crosses the road 40. The control unit 11 may detect the wheelchair 70 that crosses the road 40 based on, for example, the position information of the wheelchair 70 itself, or the position information of the terminal device 20 mounted on the wheelchair 70 or the terminal device 20 carried by the user 74 of the wheelchair 70. The control unit 11 may detect the wheelchair 70 that crosses the road 40 based on, for example, images obtained by photographing the road 40 and the surroundings of the road 40. The control unit 11 may detect the wheelchair 70 that crosses the road 40 based on, for example, the detection result of the sensor for detecting the presence of the wheelchair 70 on the road 40 and around the road 40.
Display of Pedestrian Crossing 82

The control unit 11 may cause the display device 84 to display the pedestrian crossing 82 on the road 40 to be crossed by the wheelchair 70. That is, the control unit 11 may control the display device 84 so that the pedestrian crossing 82 is displayed on the road 40 on which the vehicle 60 travels. As illustrated in FIG. 3, the control unit 11 may cause the display device 84 to display the pedestrian crossing 82 on the road surface of the road 40 in the range including the travel path 80 of the wheelchair 70. The control unit 11 may change the width of the pedestrian crossing 82 so that the wheelchair 70 traveling along the travel path 80 of the wheelchair 70 can travel within the pedestrian crossing 82.

The control unit 11 may cause the display device 84 to display the pedestrian crossing 82 along the travel path 80 of the wheelchair 70. The control unit 11 may cause the display device 84 to display the travel prohibited area 86 in the pedestrian crossing 82. Further, the control unit 11 may cause the display device 84 not to display the pedestrian crossing 82 in the travel prohibited area 86. In this way, it is possible to avoid the wheelchair 70 from entering the travel prohibited area 86 where the wheelchair 70 is difficult to travel. As a result, the convenience of the traveling of the wheelchair 70 is improved. The control unit 11 may cause the display device 84 to display the pedestrian crossing 82 along the travel path 80 of the wheelchair 70.

Although the embodiment according to the present disclosure has been described above based on the drawings and examples, it should be noted that those skilled in the art can make various modifications and alterations thereto based on the present disclosure. It should be noted, therefore, that these modifications and alterations are within the scope of the present disclosure. For example, the functions included in each means, each step, or the like can be rearranged so as not to be logically inconsistent, and a plurality of means, steps, or the like can be combined into one or divided.

What is claimed is:

1. An information processing device comprising a control unit that determines a travel path of a wheelchair, wherein the control unit determines the travel path of the wheelchair based on information on a step existing on a road surface on which the wheelchair travels and information on a wheel of the wheelchair and controls the wheelchair to travel along the travel path;
    wherein:
    when the wheelchair crosses a road, the control unit causes a display device to display a pedestrian crossing on the road surface of the road in a range including the travel path of the wheelchair; and
    the control unit causes the display device to display in the pedestrian crossing a range in which a height at which the wheel of the wheelchair enters the step is equal to or larger than a fourth threshold value as a travel prohibited area of the wheelchair.

2. The information processing device according to claim 1, wherein the control unit
calculates a height at which the wheel of the wheelchair enters the step when the wheelchair travels, based on a shape or a position of the step and a diameter or a width of the wheel of the wheelchair, and
determines the travel path of the wheelchair such that the height at which the wheel of the wheelchair enters the step is smaller than a first threshold value.

3. The information processing device according to claim 2, wherein when the step is a groove, the control unit determines the travel path of the wheelchair such that the wheel of the wheelchair passes through the groove in a direction intersecting an extending direction of the groove.

4. The information processing device according to claim 2, wherein:
the wheel of the wheelchair is a drive wheel, and the wheelchair further includes
a caster having a diameter smaller than a diameter of the drive wheel; and
the control unit determines the travel path of the wheelchair such that a height at which the drive wheel enters the step is smaller than a second threshold value and a height at which the caster enters the step is smaller than a third threshold value that is smaller than the second threshold value.

5. The information processing device according to claim 1, wherein the control unit causes a display device to display the travel path of the wheelchair on the road surface.

6. The information processing device according to claim 1, wherein the control unit causes the display device to display the pedestrian crossing along the travel path of the wheelchair.

7. The information processing device according to claim 1, wherein the control unit determines the travel path of the wheelchair such that right and left wheels of the wheelchair are alternately moved to proceed.

8. The information processing device according to claim 1, further comprising a detection unit that detects the information on the step.

9. The information processing device according to claim 1, wherein the control unit acquires the information on the step from the wheelchair.

10. The information processing device according to claim 1, wherein:
the information processing device is mounted on the wheelchair; and
the control unit causes the wheelchair to travel along the travel path of the wheelchair.

11. An information processing method for determining a travel path of a wheelchair, comprising
determining the travel path of the wheelchair based on information on a step existing on a road surface on which the wheelchair travels and information on a wheel of the wheelchair;
controlling the wheelchair to travel along the travel path;
causing, when the wheelchair crosses a road, the display device to display a pedestrian crossing on the road surface of the road in a range including the travel path of the wheelchair; and
causing the display device to display in the pedestrian crossing a range in which a height at which the wheel of the wheelchair enters the step is equal to or larger than a fourth threshold value as a travel prohibited area of the wheelchair.

12. The information processing method according to claim 11, further comprising:
calculating a height at which the wheel of the wheelchair enters the step when the wheelchair travels, based on a height or a width of the step and a width or a diameter of the wheel of the wheelchair; and
determining the travel path of the wheelchair such that the height at which the wheel of the wheelchair enters the step is smaller than a first threshold value.

13. The information processing method according to claim 11, further comprising causing a display device to display the travel path of the wheelchair on the road surface.

14. A terminal device mounted on a wheelchair or carried by a user of the wheelchair, wherein the terminal device acquires from an information processing device a travel path of the wheelchair determined by the information processing device based on information on a step existing on a road surface on which the wheelchair travels and a shape of a wheel of the wheelchair and controls the wheelchair to travel along the travel path;
wherein:
when the wheelchair crosses a road, the terminal device causes a display device to display a pedestrian crossing on the road surface of the road in a range including the travel path of the wheelchair; and
the terminal device causes the display device to display in the pedestrian crossing a range in which a height at which the wheel of the wheelchair enters the step is equal to or larger than a fourth threshold value as a travel prohibited area of the wheelchair.

15. The terminal device according to claim 14, comprising a detection unit that detects the information on the step and an interface that outputs the information on the step to the information processing device.

16. The terminal device according to claim 14, wherein the terminal device controls traveling of the wheelchair based on the travel path of the wheelchair.

* * * * *